United States Patent [19]

Schlanger

[11] Patent Number: 5,452,945
[45] Date of Patent: Sep. 26, 1995

[54] VEHICLE WHEEL

[76] Inventor: Raphael Schlanger, 18 Elton Ct., Norwalk, Conn. 06851

[21] Appl. No.: 134,660

[22] Filed: Oct. 12, 1993

[51] Int. Cl.$^6$ ................................................ B60B 1/04
[52] U.S. Cl. .................................. 301/58; 301/54; 301/104
[58] Field of Search ................................ 301/55, 58, 104, 301/95, 57

[56] References Cited

U.S. PATENT DOCUMENTS

| | | | |
|---|---|---|---|
| 720,048 | 2/1903 | Miller | 301/54 |
| 734,731 | 7/1903 | Miller | 301/54 |
| 1,384,128 | 7/1921 | Gase | 301/58 |
| 1,450,064 | 3/1923 | Dodds | 301/57 |
| 1,483,398 | 2/1924 | Whitehead | 301/104 |
| 1,492,850 | 5/1924 | Hubbard | 301/57 |
| 3,008,770 | 11/1961 | Mueller | 301/58 X |
| 3,608,971 | 9/1971 | Seibold | 301/58 |
| 5,350,221 | 9/1994 | Pearce et al. | 301/58 X |

FOREIGN PATENT DOCUMENTS

| | | | |
|---|---|---|---|
| 0130449 | 1/1985 | European Pat. Off. | 301/61 |
| 1019285 | 4/1950 | France | 301/58 |
| 2378642 | 9/1978 | France | 301/58 |
| 0211318 | 7/1984 | Germany | 301/58 |
| 1382668 | 3/1988 | U.S.S.R. | 301/55 |
| 9712 | of 1897 | United Kingdom | 301/58 |
| 4388 | of 1897 | United Kingdom | 301/104 |

*Primary Examiner*—Russell D. Stormer
*Attorney, Agent, or Firm*—Bachman & LaPointe

[57] ABSTRACT

The wheel includes an annular rim, a central hub and a plurality of spoke portions running between the rim and hub, with each spoke having a width to thickness ratio of at least 2:1, with the spoke portions having an inside portion in fixed relationship to the hub and an outside portion in fixed relationship to the rim with the spoke portions extending radially outwardly between the hub and rim. A circular member is provided affixed to at least one of the inside and outside spoke portions defining an enclosed, continuous hollow annulus and including fasteners within the hollow annulus for affixing said spoke portions to said circular member.

34 Claims, 6 Drawing Sheets

VEHICLE WHEEL

BACKGROUND OF THE INVENTION

This invention relates to a vehicle wheel and especially to a bicycle wheel having a rim section, a plurality of spoke sections and a hub section.

In recent years, participation in competitive cycling has increased dramatically and has created a demand for greater performance characteristics from cycling equipment. It is generally acknowledged that reduced aerodynamic drag, lower weight, increased rider comfort, lower maintenance and reduced cost are goals to consider when attempting to enhance the performance of bicycle equipment.

Conventional bicycle wheels are typically constructed using 28 or more individual wire spokes. Each of these spokes must continually break the wind as the wheel rotates, creating aerodynamic drag. An attempt to overcome some of this aerodynamic drag has been to construct the bicycle wheel as a solid disc. Although these disc wheels reduce the aerodynamic drag, rider stability and safety are significantly compromised. If prevailing wind patterns have any component perpendicular to the riders direction of travel, as is most often the case, the disc wheel acts as a sail resulting in a potentially dangerous instability problem. More recently, several manufacturers have introduced one-piece spoke wheels constructed from fiber reinforced plastic. These wheels attempt to reduce aerodynamic drag by reducing the number of individual spokes to three or five. However, in an effort to maintain lateral rigidity, these wheels utilize additional material in construction and weigh significantly more than a conventional wheel of comparable size. Additionally, the manufacturing processes required to produce these plastic spoke wheels are quite complex. Fabrication involves careful wrapping of fiber reinforcement cloth around a foam armature or plastic bladder, placing this assembly within a mold, together with uncured resin, and applying heat and pressure to the mold to cure the resin. This process is very labor intensive and requires highly skilled production personnel. Also, the disc type wheels and the plastic spoke wheels have been described as lacking the shock absorption and resiliency of conventional wheels, resulting in a more uncomfortable ride. These disc type wheels and plastic spoke wheels act to support a load on the axle through compression of the spoke or disc sector between the hub and the ground resulting in excessive rigidity. Conventional wheels support this load through tension of the spokes above the hub. It is this tension loading which gives the conventional wheel its resilient feel.

U.S. Pat. No. 5,104,199 represents an improvement over the foregoing and describes a vehicle wheel including an annular rim, a central hub, a plurality of spoke portions running between the rim and hub, and two wheel portions integrally joined to each other and including the spoke portions. It is desirable to provide a still further improvement over this construction.

It is particularly desirable to provide an improved vehicle wheel, especially a bicycle wheel, that can be manufactured at a reasonable cost through a configuration that leads itself to simple manufacturing processes, fewer component parts and minimal raw material. It would be highly advantageous to provide such a bicycle wheel with low aerodynamic drag and limiting the number of individual spokes and minimizing the spoke frontal area in the direction of rotation.

It would be particularly advantageous to provide a bicycle wheel as aforesaid which enables one to utilize spokes that are predetermined along their longitudinal axis to create a static structure with tension elements (spokes) and compression elements (rim and hub shell).

It is a further objective to enable one to provide a vehicle wheel as aforesaid that is light weight by utilizing light weight, high strength materials and by reducing the volume of material required to produce a structurally sound product.

Further objects and advantages of the present invention will appear hereinbelow.

SUMMARY OF THE INVENTION

The present invention provides a spoked wheel achieving the objects and advantages set forth hereinabove.

The spoked wheel of the present invention comprises: an annular rim; a central hub; a plurality of spokes running between the rim and hub, with each spoke having a width to thickness ratio of at least 2:1, wherein said spokes having a first end comprising an inside spoke portion in fixed relationship to the hub and a second end opposed to the first end comprising an outside spoke portion in fixed relationship to the rim, and wherein said spokes extend radially outwardly between the hub and rim; a circular member affixed to at least one of the inside and outside spoke portions, said circular member defining an enclosed, continuous hollow annulus; and wherein said spokes are fixed at one end along the width thereof, and including means with said hollow annulus for adjustably fixing said opposed end to said circular member.

The spoked wheel of the present invention also comprises: an annular rim; a central hub; a plurality of spokes running between the rim and hub, with each spoke having a width to thickness ratio of at least 2:1 and preferably at least 4:1, wherein said spokes have an inside spoke portion in fixed relationship to the hub and an outside spoke portion in fixed relationship to the rim and wherein said spokes extend radially outwardly between the hub and rim; a circular member affixed to at least one of the inside and outside spoke portions, said circular member defining an enclosed, continuous hollow annulus; and means within said hollow annulus for affixing said spokes to said circular member. In a preferred embodiment the circular member is an outside circular member between the rim and hub and defines an enclosed, continuous, circumferential hollow annulus for supporting hoop stress, said circular member retaining the annular rim outwardly of the spoke portions. In this embodiment, the outside spoke portions are affixed to the circular member.

In a preferred embodiment, the hollow annulus includes means for adjusting the tension of the spokes. Also, it is preferred that the spokes extend inwardly to a common spoke spider portion which in turn is affixed to the hub. It is preferred to provide that the spoked wheel of the present invention includes at least two wheel portions including the spokes affixed together to form the spoked wheel.

In accordance with the present invention, the wheel portions and spokes may be symmetrically opposed to each other or in staggered relationship with respect to each other.

It is particularly advantageous to provide that each spoke is affixed to the circular member in at least two spaced locations in order to provide an extremely rigid and stable structure. One may provide covers affixed to the outside portion of each spoke portion and fastening means extending from the cover to the means with the hollow annulus for affixing the spokes to the circular member. One may include inserts affixed to the spokes within the outside spoke portion, and fastening means extending from the inserts to the means within the hollow annulus.

Alternatively, one may include U-shaped fasteners extending from the outside spoke portion to the means within the hollow annulus, wherein the outside spoke portion is affixed to the U-shaped fasteners. The outside spoke portion may surround the center portion of the U-shaped fasteners.

As a still further alternative, one may include two special fasteners affixed to the outside portion of each spoke portion and to the means within the hollow annulus.

As a still further alternative, the outside spoke portion includes an enlarged head portion which extends into the hollow annulus, or the hollow annulus may include a depending slot which engages the head portions.

Each spoke may include an end portion thereof which extends into the hollow annulus including fastening means extending from the end portions to a location outside of the hollow annulus to affix the spokes to the circular member. Means may be provided whereby each spoke is affixed to one side of the circular member and to the axially opposite side of the hub. Means may also be provided whereby each spoke is affixed to one side of the circular member and is also affixed to an opposed spoke. In addition, means may be provided for affixing each spoke portion to one side of the circular member, including a depending flange extending from said circular member, and means for affixing each spoke to said depending flange.

Further features of the present invention will appear hereinbelow.

BRIEF DESCRIPTION OF THE DRAWINGS

The present invention will be more readily understandable from the accompanying drawings.

DETAILED DESCRIPTION OF PREFERRED EMBODIMENTS

Figure 1:
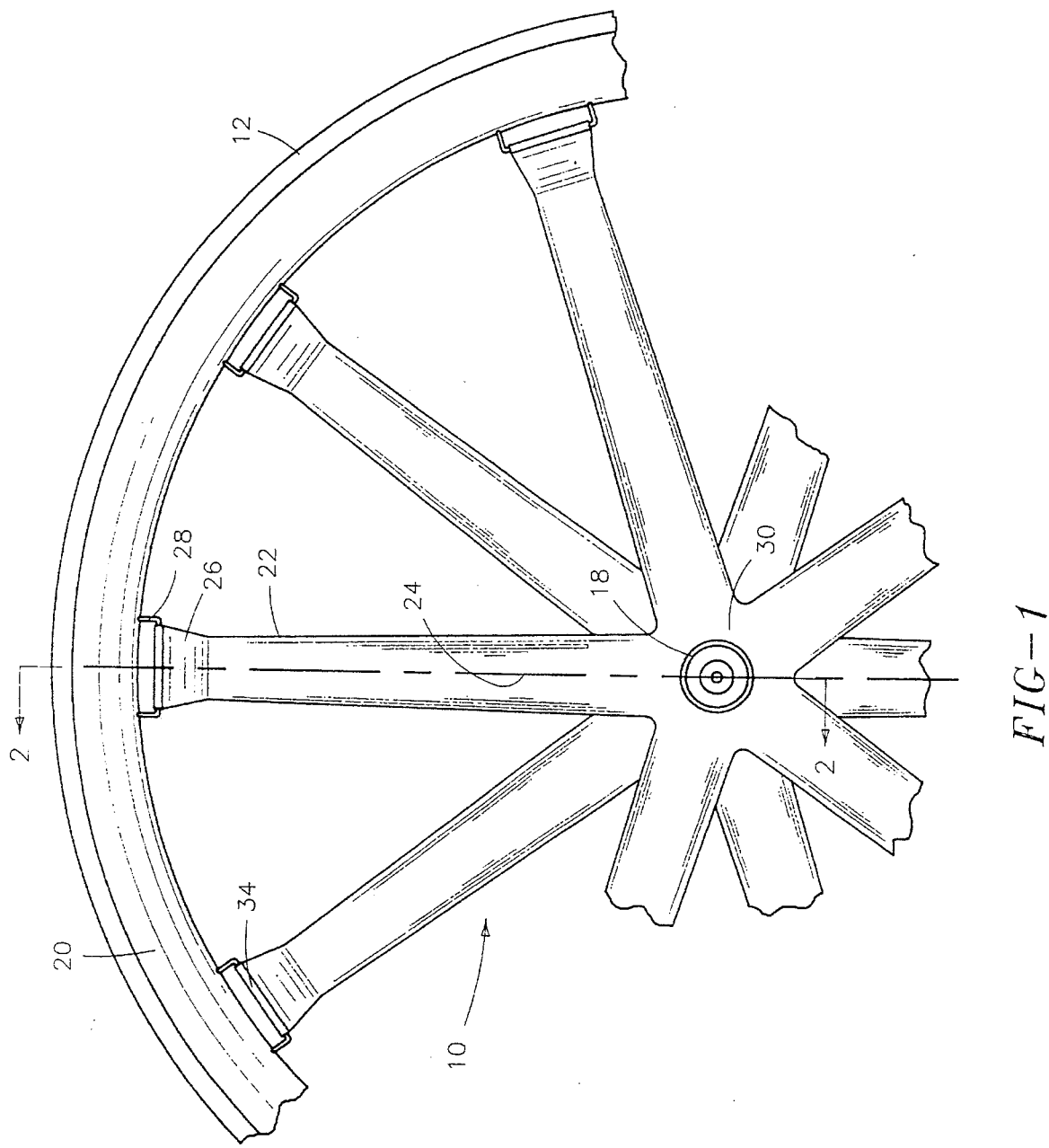
FIG. 1 is a partial front view of the preferred embodiment of the wheel construction.
Figure 2:
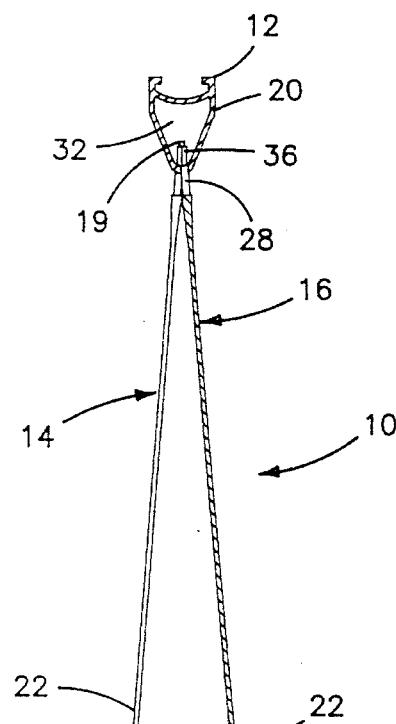
FIG. 2 is a cross-sectional view taken along line 2—2 of FIG. 1.

Referring to the drawings, a preferred embodiment is shown in FIG. 1–2. Referring to FIGS. 1 and 2, wheel 10 includes an annular rim or rim hoop 12 sandwiched between the left wheel half 14 and the right wheel half 16 and extending outwardly therefrom. The central hub or hub shell 18 is of a generally cylindrical configuration and is connected around its perimeter at one end to the left wheel half 14 and at the other end to the right wheel half 16. The wheel 10 also includes a circular member 20 supporting rim portion 12 and affixed to spokes 22. Spokes 22 have an inside spoke portion thereof 24 and an outside spoke portion thereof 26. The outside spoke portion 26 is affixed to the circular member 20 via U-shaped fasteners 28 in a manner which will be described below.

The inside spoke portions are joined together at the hub 18 to create a common spoke spider 30. The spokes are connected to the circular member and rim in an alternating fashion. As indicated above, each outside spoke portion 26 is connected to circular member 20 via U-shaped fasteners 28 which are threaded at both ends. Circular member 20 defines an enclosed, continuous hollow annulus 32 for supporting hoop stress. The spoke material is connected to the U-shaped fasteners as by wrapping around the center portion of the U-shaped fastener at the outward extremity 34 of spoke 22 (see FIG. 6), and the threaded ends 19 of the U-shaped fasteners 28 extend into the hollow annulus 32 and are affixed to holding means therein, as nuts 36. The nuts may be passed into hollow annulus 32 via access holes 38 (see FIG. 3). Spoke tension can now be adjusted by tightening or loosening these nuts in a manner similar to the spoke adjustment of a conventional wheel.

The spoke spider 30 is fixed to hub 18 by any convenient means as by turned flange 40 which is bonded to hub 18.

The hub 18 includes bearings 42, hub shell 44 and axle 46 passing therethrough.

The multiple anchor points of the spoke end are beneficial in several ways. Since the spokes contribute to aerodynamic drag, it is beneficial to use fewer spokes. This creates greater stress on the individual spokes. Multiple fasteners can handle more stress than a single fastener and also serve to distribute the load over a wider portion of the circular member and rim, creating less stress concentration in these components. Also, anchoring these wide spokes at their outer corners will aid in transmitting torque between the hub and rim which is particularly important with a rear wheel.

FIGS. 3–7 show alternate methods of joining the flat spoke to the circular member. All of these use the beneficial multiple anchor points.

Figure 3:
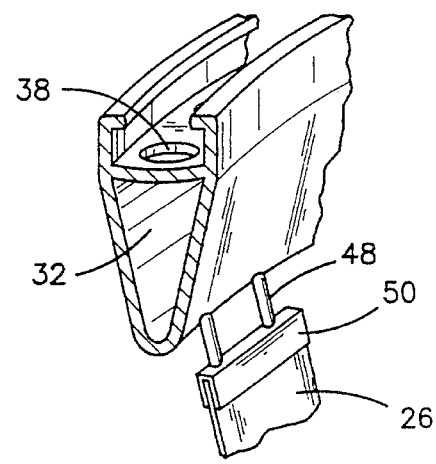
FIG. 3 is a partial perspective view of an alternate embodiment of the present invention.

FIG. 3 uses at least two threaded fasteners 48 connected to spoke outside portion 26 via metal cover 50 which is bonded to spoke outside portion 26. The threaded ends of fasteners 48 extend into hollow annulus 32 and are affixed to nuts or the like in the same way as in FIG. 2.

Figure 4:
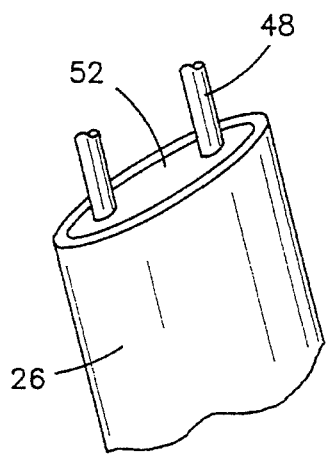
FIGS. 4 and 5 are partial perspective views of alternate spoke portion constructions.
Figure 5:
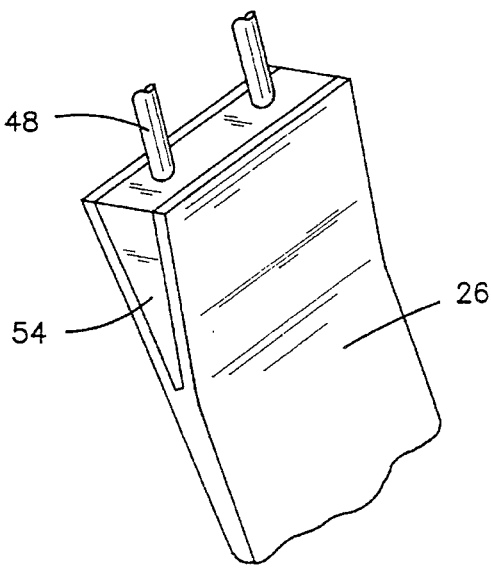

FIGS. 4 and 5 show threaded fasteners 48 affixed to inserts 52 and 54, respectively, which are bonded inside spoke outside portion 26.

Figure 6:
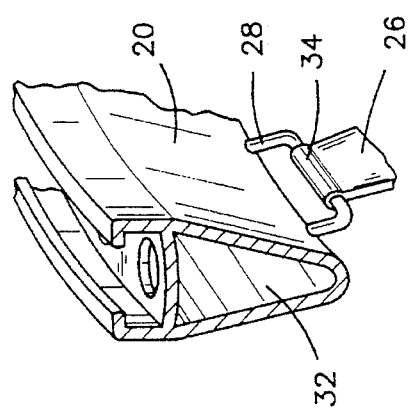

FIG. 6 shows a detail of the embodiment of FIGS. 1 and 2 wherein U-shaped fastener 28 has threaded ends (not shown in FIG. 6) which extend into the hollow annulus 32 of circular member 20. Outward extremity 34 of outside spoke portion 26 is wrapped around the center portion of the U-shaped fastener.

Figure 7:
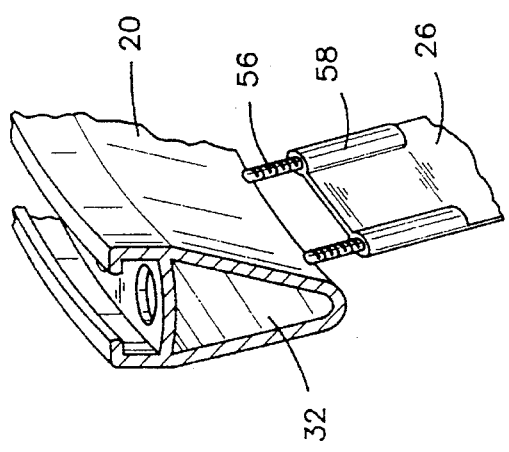

FIG. 7 shows two spaced threaded fasteners 56 extending from enlarged portion 58 of outside spoke portion 26 into hollow annulus 32 to be affixed therein as in other embodiments.

Figure 8:
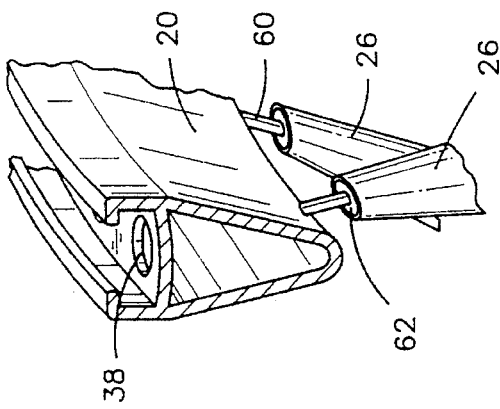
FIGS. 6–16 are partial perspective views of alternate embodiments of the present invention.

FIG. 8 shows an alternate embodiment wherein a single threaded fastener 60 is affixed to each outside spoke portion 26 via inserts 62 in a manner similar to FIGS. 4–5; however, there is only one threaded fastener for each spoke end connection instead of two.

Figure 10:
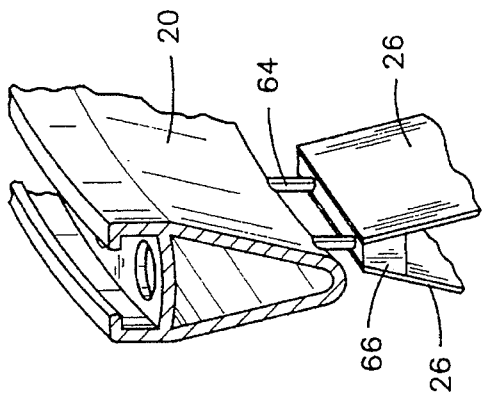
Figure 9:
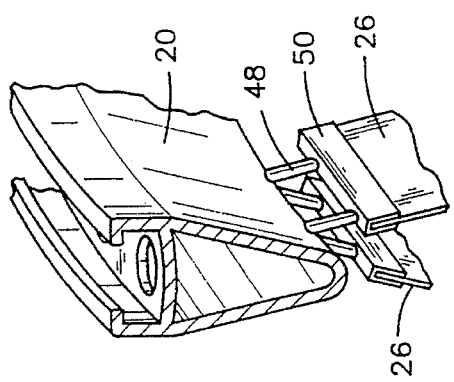

FIGS. 9 and 10 show an opposed spoke configuration instead of an alternating configuration as in FIGS. 1 and 2. FIG. 9 shows each outside spoke portion 26 with two threaded fasteners 48 connected thereto via metal cover 50 affixed to the spoke portion as in FIG. 3. FIG. 10 shows two threaded fasteners connected to outside spoke portion 26 via a single insert 66 affixed to two opposed outside spoke portions 26.

Figure 11:
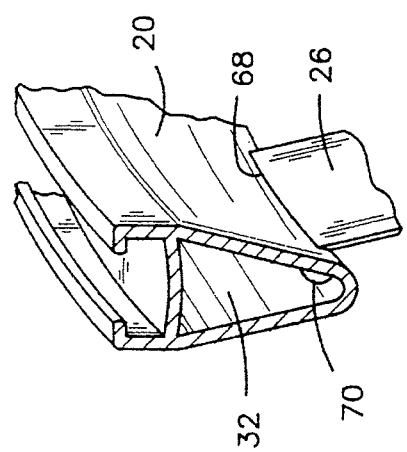
Figure 12:
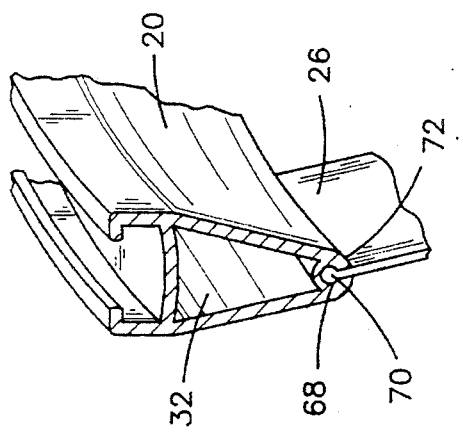
Figure 13:
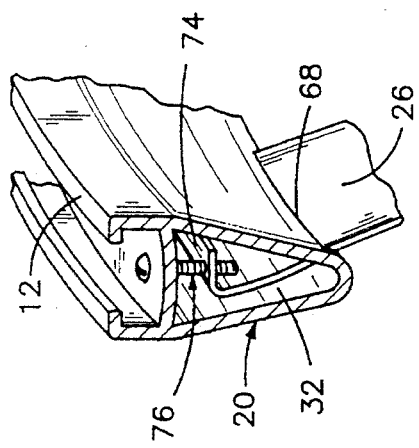

FIGS. 11–13 show a spoke connection wherein the outside spoke portions 26 pass through an elongated slot 68 in circular member 20. The configurations shown in FIGS. 11–13 could be used in either an alternating or opposed spoke configuration. FIG. 11 shows outside spoke portion 26 including an enlarged end 70 which is passed through slot 68 and seated within annulus 32. In FIG. 12, the enlarged end 70 is seated in continuous slot 72 which is formed from circular member 20 adjacent outside spoke portion 26. FIG. 13 anchors outside spoke portion 26 within annulus 32 via flange 74 of outside spoke portion 26 affixed to rim 12 by threaded fastener 76 which may easily be used for spoke tension adjustment.

Figure 14:
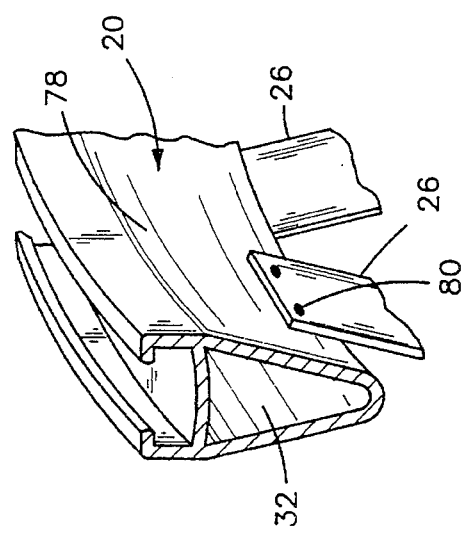
Figure 15:
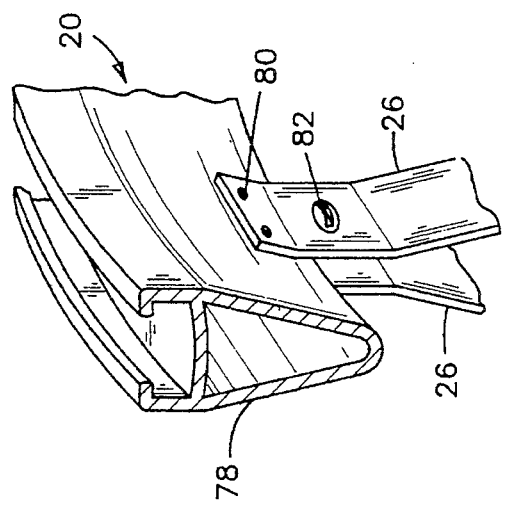
Figure 16:
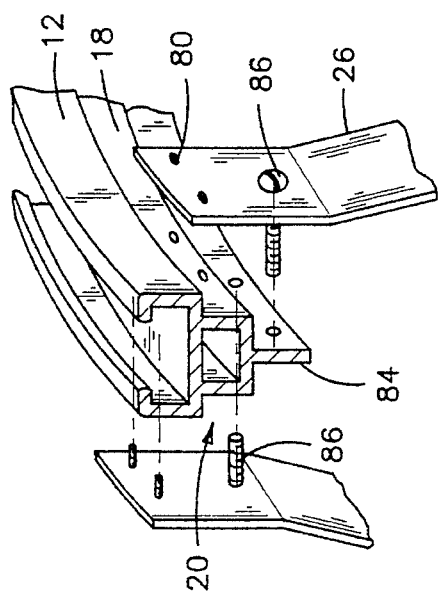

FIGS. 14–16 show spoke connections where the outside spoke portions 26 are fastened to the side wall 78 of circular member 20. These embodiments could also be used in opposed or alternating spoke arrangements.

FIG. 14 shows wide spoke outside portion 26 fastened to one side of circular member side wall 78 via fasteners 80 extending into annulus 32, with the spokes extending to the axially opposite side of the hub. This arrangement would only be possible in an alternating spoke configuration. The spoke could also connect to a tab or flange portion of the circular member, if desired.

FIG. 15 shows an opposed spoke configuration where each outside spoke portion 26 is connected to its respective side of the hub. Each outside spoke portion 26 is first affixed to circular member side wall 78 via fasteners 80 as in FIG. 14. In addition, threaded fastener 82 is provided extending between two opposed outside spoke portions anchoring them together at a point inboard from the spoke-circular member anchoring point. This fastener 82 is aligned in a generally axial direction and may be used as a means to create or adjust spoke tension.

FIG. 16 is similar to FIG. 15 except that circular member 20 includes a depending flange 84 for fasteners 86 inboard of the outside spoke portion-circular member anchoring point which can be used in the same manner as fastener 82 in FIG. 15.

Figure 17:
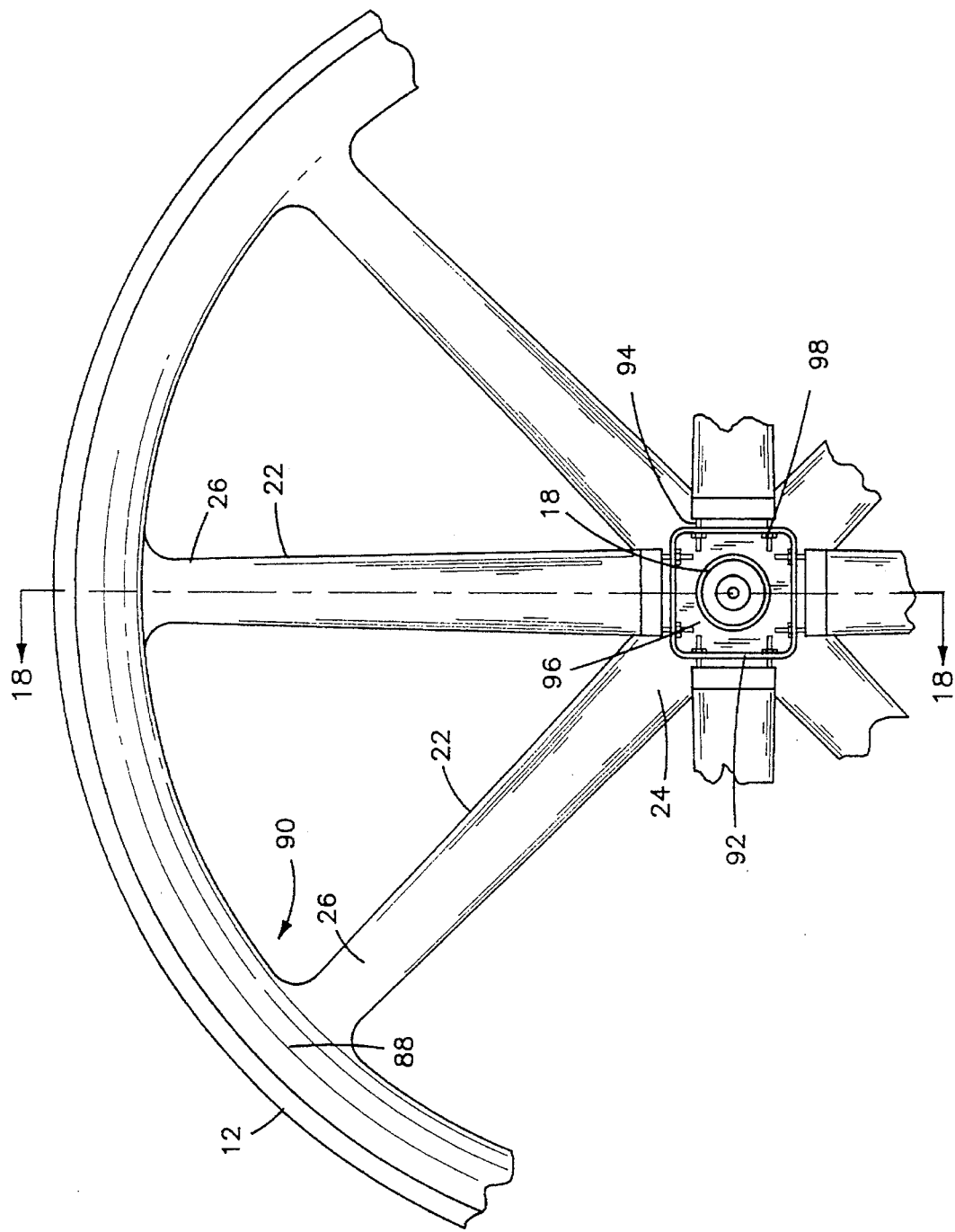
FIG. 17 is a partial side view of a further embodiment of the present invention.
Figure 18:
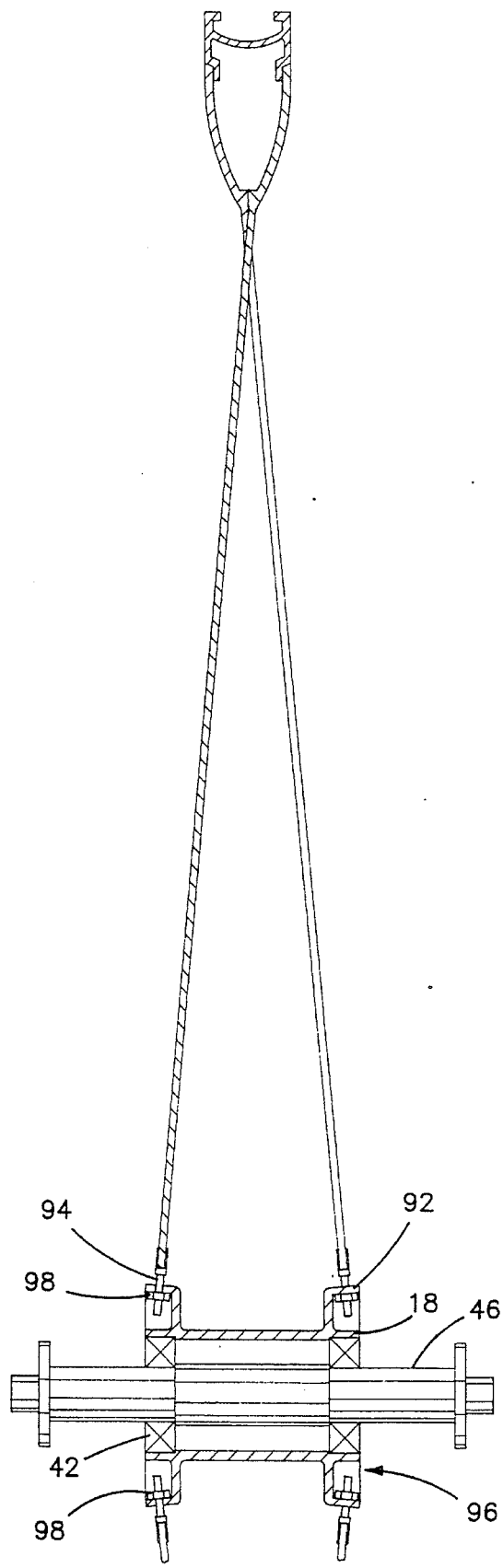
FIG. 18 is a sectional view along lines 18—18 of FIG. 17.

FIGS. 17–18 show an alternate embodiment wherein outside spoke portions 26 of spokes 22 are integral with outside circular member 88 and/or if desired integral with rim 12, forming an outside spoke spider 90. Inside spoke portions 24 are affixed to inside circular member 92 surrounding hub 18 and affixed thereto as by multiple threaded fasteners 94 extending from the inside spoke portions 24 to inside circular member 92 and into inside hollow annulus 96 formed by inside circular member 92. Fixing means as nuts 98 engage fasteners 94 within annulus 96 in a manner after the other embodiments. This arrangement permits easy adjustment of spoke tension and a firm spoke connection.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A spoked wheel comprising:
   an annular rim;
   a central hub;
   a plurality of spokes running between the rim and hub, with each spoke having width to thickness ratio of at least 2:1, wherein said spokes have spoke portions including an inside spoke portion in fixed relationship to the hub and an outside spoke portion in fixed relationship to the rim, and wherein said spokes extend radially outwardly between the hub and rim;
   an encircling member affixed to at least one of the inside and outside spoke portions and included with at least one of the annular rim and the central hub, said encircling member defining a continuous hollow annulus;
   means adjacent said hollow annulus for affixing said spokes to said encircling member, wherein at least one of said spokes is affixed to the encircling member in at least two spaced locations; and
   means connected with the spokes for adjusting the tension of the spokes.

2. A spoked wheel according to claim 1 wherein said encircling member is an outside circular member between the rim and hub and defines an enclosed, continuous, circumferential hollow annulus for supporting hoop stress.

3. A spoked wheel according to claim 2 wherein said outside circular member retains the annular rim outwardly of the spoke portions and wherein the outside spoke portions are affixed to the outside circular member.

4. A spoked wheel according to claim 3 wherein the outside spoke portion includes an enlarged head portion which extends into the hollow annulus for affixing the spokes to the circular member.

5. A spoked wheel according to claim 3 wherein the hollow annulus includes a depending slot which engages an enlarged head portion of the outside spoke portion for affixing the spokes to the circular member.

6. A spoked wheel according to claim 2 including means whereby each spoke is affixed to one side of the circular member and to the axially opposite side of the hub.

7. A spoked wheel according to claim 2 wherein the circular member includes a depending flange, including means for affixing each spoke to said depending flange.

8. A spoked wheel according to claim 2, wherein said circular member is formed integrally with said annular rim.

9. A spoked wheel according to claim 1 wherein the spokes are symmetrically opposed to each other.

10. A spoked wheel according to claim 1 wherein the spokes are in staggered relationship with respect to each other.

11. A spoked wheel according to claim 1 wherein at least one of said spokes includes an end portion thereof which extends into the hollow annulus, and including fastening means extending from the end portion to a location connected to the hollow annulus to affix the at least one spoke to the encircling member.

12. A spoked wheel according to claim 1 including means whereby each spoke is affixed to one side of the encircling member and is also affixed to an opposed spoke.

13. A spoked wheel according to claim 1, wherein the two spaced locations are circumferentially spaced, including a space therebetween.

14. A spoked wheel according to claim 13, wherein the space is equal to or wider than the narrowest portion of the spoke.

15. A spoked wheel according to claim 1, wherein the spokes are formed from a singular, solid portion of material.

16. A spoked wheel according to claim 1, wherein said means for adjusting the tension is positioned within the hollow annulus.

17. A spoked wheel according to claim 1, wherein said spokes have a width to thickness ratio of at least 10:1.

18. A spoked wheel according to claim 1, wherein said spokes are symmetrically opposed and integrally joined at said outside spoke portions, forming an outer spoke spider.

19. A spoked wheel according to claim 18, wherein the symmetrically opposed spokes extend to opposite ends of said central hub.

20. A spoked wheel according to claim 1, wherein said spokes are symmetrically opposed and are integrally joined to non-opposed spokes at said inside spoke portions.

21. A spoked wheel according to claim 1, wherein the means for affixing said spokes includes the means for adjusting the tension of the spokes.

22. A spoked wheel according to claim 1, wherein the means adjacent said hollow annulus for affixing said spokes are positioned within said hollow annulus.

23. A spoked wheel according to claim 1, wherein at least one of said inside spoke portion and said outside spoke portion of at least one of said spokes includes an enlarged head portion which extends into the hollow annulus and affixes said at least one of the spokes to the encircling member.

24. A spoked wheel according to claim 1, wherein the encircling member is an inside encircling member defining a continuous hollow annulus.

25. A spoked wheel comprising:
an annular rim;
a central hub;
a plurality of spokes running between the rim and hub, with each spoke having width to thickness ratio of at least 2:1, wherein said spokes have spoke portions including an inside spoke portion in fixed relationship to the hub and an outside spoke portion in fixed relationship to the rim, and wherein said spokes extend radially outwardly between the hub and rim and wherein the spokes extend inwardly to a common spoke spider which in turn is affixed to the hub;
an encircling member affixed to at least one of the inside and outside spoke portions and included with at least one of the annular rim and the central hub, said encircling member defining a continuous hollow annulus;
means adjacent said hollow annulus for affixing said spokes to said encircling member; and
means connected with the spokes for adjusting the tension of the spokes.

26. A spoked wheel according to claim 25, further including a spoke spider attached to each end of the central hub.

27. A spoked wheel comprising:
an annular rim;
a central hub;
a plurality of spokes running between the rim and hub, with each spoke having width to thickness ratio of at least 2:1, wherein said spokes have spoke portions including an inside spoke portion in fixed relationship to the hub and an outside spoke portion in fixed relationship to the rim, and wherein said spokes extend radially outwardly between the hub and rim;
an encircling member affixed to at least one of the inside and outside spoke portions and included with at least one of the annular rim and the central hub, said encircling member defining a continuous hollow annulus;
means adjacent said hollow annulus for affixing said spokes to said encircling member;
means connected with the spokes for adjusting the tension of the spokes; and
said wheel including at least two wheel portions, wherein one portion includes the spokes being integrally affixed together.

28. A spoked wheel according to claim 27, wherein a plurality of the spokes are integrally joined at a common end of said central hub.

29. A spoked wheel comprising:
an annular rim;
a central hub;
a plurality of spokes running between the rim and hub, with each spoke having width to thickness ratio of at least 2:1, wherein said spokes have spoke portions including an inside spoke portion in fixed relationship to the hub and an outside spoke portion in fixed relationship to the rim, and wherein said spokes extend radially outwardly between the hub and rim;
an encircling member affixed to at least one of the inside and outside spoke portions and included with at least one of the annular rim and the central hub, said encircling member defining a continuous hollow annulus;
means adjacent said hollow annulus for affixing said spokes to said encircling member;
means connected with the spokes for adjusting the tension of the spokes; and
including a cover affixed to at least one of the inside spoke portion and the outside spoke portion of at least one spoke, and fastening means attached to and extending from the cover to the means adjacent the hollow annulus for affixing the at least one spoke to the encircling member, wherein said cover is positioned between said at least one spoke and said encircling member.

30. A spoked wheel comprising:
an annular rim;
a central hub;
a plurality of spokes running between the rim and hub, with each spoke having width to thickness ratio of at least 2:1, wherein said spokes have spoke portions including an inside spoke portion in fixed relationship to the hub and an outside spoke portion in fixed relationship to the rim, and wherein said spokes extend radially outwardly between the hub and rim;
an encircling member affixed to at least one of the inside and outside spoke portions and included with at least one of the annular rim and the central hub, said encircling member defining a continuous hollow annulus;
means adjacent said hollow annulus for affixing said spokes to said encircling member;
means connected with the spokes for adjusting the tension of the spokes; and
an insert positioned within at least one of said outside spoke portion and said inside spoke portion of at least one of the spokes, and fastening means extending from the insert to the means adjacent the hollow annulus for affixing the at least one spoke to the encircling member, wherein said insert is positioned between said at least one spoke and said encircling member.

31. A spoked wheel comprising:

an annular rim;

a central hub;

a plurality of spokes running between the rim and hub, with each spoke having width to thickness ratio of at least 2:1, wherein said spokes have an inside spoke portion in fixed relationship to the hub and an outside spoke portion in fixed relationship to the rim, and wherein said spokes extend radially outwardly between the hub and rim;

an encircling member affixed to at least one of the inside and outside spoke portions and included with at least one of the annular rim and the central hub, said encircling member defining a continuous hollow annulus; and wherein said spokes are affixed at one end to at least one of said encircling member and said hub along the entire width of said one end, wherein said width of said one end is substantially equal to or less than the width of said spoke, and including means adjacent said hollow annulus for adjustably fixing said one end to said encircling member.

32. A spoked wheel comprising:

an annular rim including an outside circular member;

a central hub;

a plurality of spokes running between the rim and hub, with each spoke having a width to thickness ratio of at least 2:1 wherein said spokes have an inside spoke portion in fixed relationship to the hub and an outside spoke portion in fixed relationship to the rim, and wherein said spokes extend radially outwardly between the hub and rim;

said outside circular member affixed to the outside spoke portions and positioned between the rim and the hub, the outside circular member defining an enclosed continuous circumferential hollow annulus for supporting hoop stress, wherein the outside circular member retains the annular rim outwardly of the spoke portions;

a U-shaped fastener extending from the outside spoke portion of at least one of said plurality of spokes and into the hollow annulus, wherein said U-shaped fastener is attached to said at least one spoke and is a discrete member with end portions directed toward said circular member; and fastening means within the hollow annulus affixed to the U-shaped fastener for affixing the at least one spoke to the circular member.

33. A spoked wheel comprising:

an annular rim;

a central hub;

a plurality of spokes running between the rim and hub, with each spoke having width to thickness ratio of at least 2:1, wherein said spokes have spoke portions including an inside spoke portion in fixed relationship to the hub and an outside spoke portion in fixed relationship to the rim, and wherein said spokes extend radially outwardly between the hub and rim;

an encircling member affixed to at least one of the inside and outside spoke portions and included with at least one of the annular rim and the central hub, said encircling member defining a continuous hollow annulus;

means adjacent said hollow annulus for affixing said spokes to said encircling member;

means connected with the spokes for adjusting the tension of the spokes; and wherein said spokes are formed separately from the annular rim, the central hub and the encircling member and are affixed at at least one end along the entire width of said one end to at least one of said encircling member and said hub, wherein said width of said one end is substantially equal to or less than the width of said spoke.

34. A spoked wheel comprising:

an annular rim;

a central hub;

a plurality of spokes running between the rim and hub, with each spoke having width to thickness ratio of at least 2:1, wherein said spokes have spoke portions including an inside spoke portion in fixed relationship to the hub and an outside spoke portion in fixed relationship to the rim, and wherein said spokes extend radially outwardly between the hub and rim;

an encircling member affixed to at least one of the inside and outside spoke portions and included with at least one of the annular rim and the central hub, said encircling member defining a continuous hollow annulus;

means adjacent said hollow annulus for affixing said spokes to said encircling member;

means connected with the spokes for adjusting the tension of the spokes; and wherein the hollow annulus includes at least one depending slot adapted to receive and which engages an enlarged head portion of at least one of the spoke portions for affixing at least one of the spokes to the encircling member, wherein said slot substantially limits pivoting of said spoke in a direction parallel to said width.

* * * * *